March 14, 1961 C. A. DEAN 2,974,739
CORE ORIENTING APPARATUS
Filed March 31, 1958 3 Sheets-Sheet 1

INVENTOR
CHARLES A. DEAN
BY J. Howard Flint
ATTORNEY

March 14, 1961 C. A. DEAN 2,974,739
CORE ORIENTING APPARATUS
Filed March 31, 1958 3 Sheets-Sheet 2

INVENTOR
CHARLES A. DEAN
BY J. Howard Flint
ATTORNEY

March 14, 1961

C. A. DEAN 2,974,739

CORE ORIENTING APPARATUS

Filed March 31, 1958

INVENTOR
CHARLES A. DEAN
BY J. Howard Flint.
ATTORNEY

United States Patent Office 2,974,739
Patented Mar. 14, 1961

2,974,739

CORE ORIENTING APPARATUS

Charles A. Dean, 11019 S. Hoover St., Los Angeles, Calif., assignor by decree of distribution to Geraldine C. Dean Filed Mar. 31, 1958, Ser. No. 725,164

13 Claims. (Cl. 175—2)

This invention relates to improvements in apparatus, to measure earth formations, improvements particularly in core drills to orient earth strata. The invention is useful especially in the wire line type of core drill. In this, a receiver for a core is dropped into a rotary drill string and then withdrawn with the core without removing the drill.

Core drills today sample the earth strata at depths of thousands of feet or even a mile or two. A single core may show the variety and nature of many deep earth beds. Some yield information of the inclination or dip of the beds as well as their compass direction or strike. Thus a network of core drillings should enable those skilled in the art to log and map the drainage of given oil-bearing sands into a "pool."

Logging of structures with a core drill under systems to which this invention pertains requires coring integral samples from the formation without disturbing the bedding of the core. Distortion renders uncertain both accuracy of sampling and correlation of parts of the samples. Since cutting these cores involves rotation of a cutter head, resulting turning strains often appear in twisted and even shattered cores. This has been a practical limitation on interpreting the samples. Orientation and integrity of the sample are essential.

Wire line core drills offer advantages in supplying and retrieving core containers from the bore hole at will. The core can be kept concealed in its container for subsequent examination. Field operations can continue at length with simple replacement of core containers with the drill in place. Well survey instruments may be lowered in the core barrel and so avoid prolonged exposure to unfavorable shocks, moisture and temperature in the bore hole.

These wire line structures retrieve cores in simple manner, utilizing a spear head at the top of the core barrel, to be overshot by a grab element lowered on a small cable into the drill pipe.

A recording well survey unit sometimes has been placed in the core barrel with a timer. This arrangement photographs shadows of the survey instrument at a given time, to record compass and inclination angles of the drill. But correlating these bearings with the earth formations being logged encounters practical problems.

Correlation by reference marks on the core sample after the core is cut is uncertain. The core tends to become twisted or broken, to change relationships between beds or strata in the sample and so fail to reflect accurately the original formation in the earth. It is the original positioning in the earth that is important. Alterations on the surface of the core may be misleading. Marking a core after it is cut renders uncertain any calculations of the original dip and strike of the beds as they are in the earth.

An object of this invention is to improve accuracy in core-orienting with respect to strata as they are in the earth.

A further object is to simplify field operations in orienting a core, particularly at the bottom of a bore hole. A related object is to simplify observations in orienting a core, whether in the field or not, and to extend the value of such observations after a core has been removed not only from the bore but from the field.

An object also is to provide means to indicate any alteration in a core sample, and, if any, to show the nature and extent of alteration despite slippage or crumbling in the sample. This invention provides means also to cross-check given strata or even a given sample at the bottom of a bore hole.

A purpose further is to simplify and to expedite logging operations of a core after removal from a bore. Incidental to this purpose is to make a core substantially direct-reading.

A further object is to provide improvements to identify an earth core.

A special object is to assure that means for these purposes be simple, rugged and inexpensive to manufacture. Subsidiary to this is to provide such means in a wire line core drill.

A particular object of considerable importance is to provide core-orienting means that function accurately and dependably in existing wire-line core drills.

These and other objects appear in the preferred form of this invention illustrated in the accompanying drawings and following description. Novel features of this invention are pointed out in the appended claims.

Figure 1:
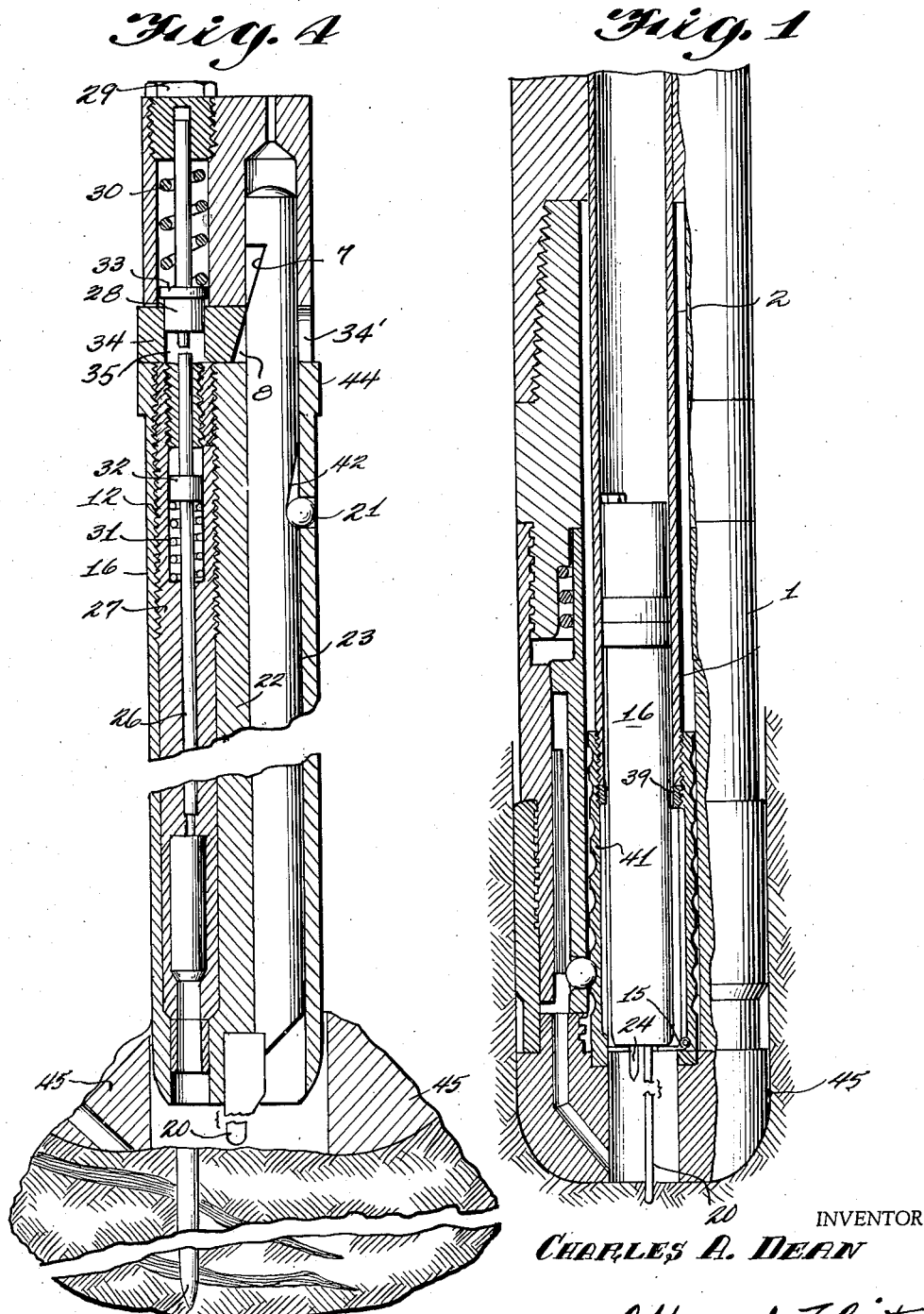
Fig. 1 is a longitudinal view of the lower or coring part of a core drill, partly in vertical section to show an inner core barrel or receiver and to show a gun unit housed in the barrel.
Figure 3:
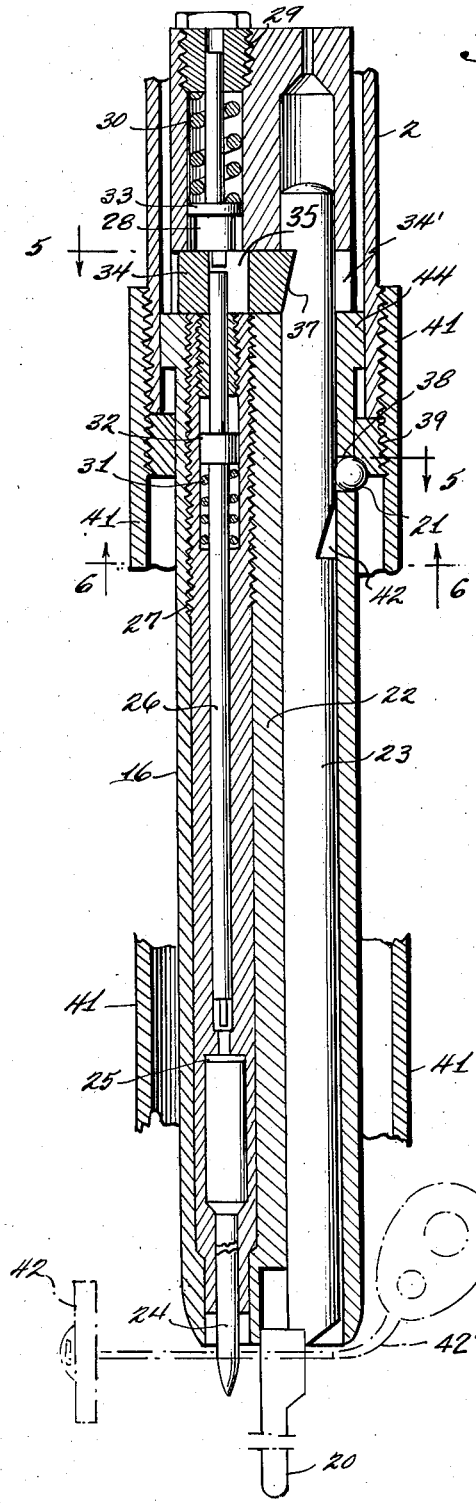

Figs. 3 and 4 are correlated longitudinal views in section through the gun unit of Fig. 1. Fig. 3 shows this unit locked before firing. Fig. 4 shows this unit after firing, before subsequent coring has begun.

Fig. 4 shows also a modification strengthening the gun barrel.

Figure 5:
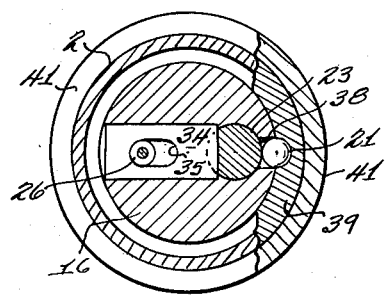

Fig. 5 shows the gun unit in transverse section looking down upon trigger latching means along the broken line 5—5 of Fig. 3.

Figure 6:
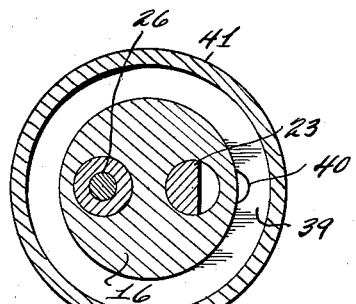

Fig. 6 shows the gun unit in transverse section looking up to means locking the gun unit in fixed position before firing, along the line 6—6 of Fig. 3.

Figure 7:
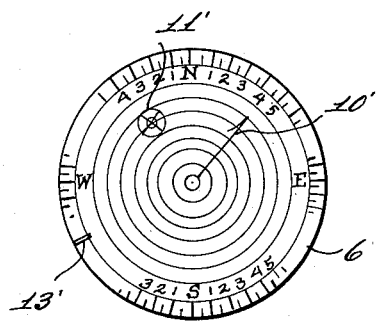

Fig. 7 is a view of a photographic disk showing reference positions recorded by the well survey unit.

Advantages of this invention flow from injecting an orienting element parallel to the longitudinal axis of a cylindrical core barrel and into the formation of the bore floor beneath the drill. This may be described herein as lengthwise of the barrel, inasmuch as deviation may be restored by a correction factor. In specific means, a gun unit correlated with a survey unit fires a bullet from the core barrel down into the bottom formation about to be cored. A photographic record of the survey unit automatically shows the bearings or resulting penetrant tract in the core area to be sampled. Suitable elements of the missile also can trace and identify a given track in the core or distinguish between several such tracks.

Further description of this invention follows with reference to the particular form illustrated in the drawings.

Figure 2:
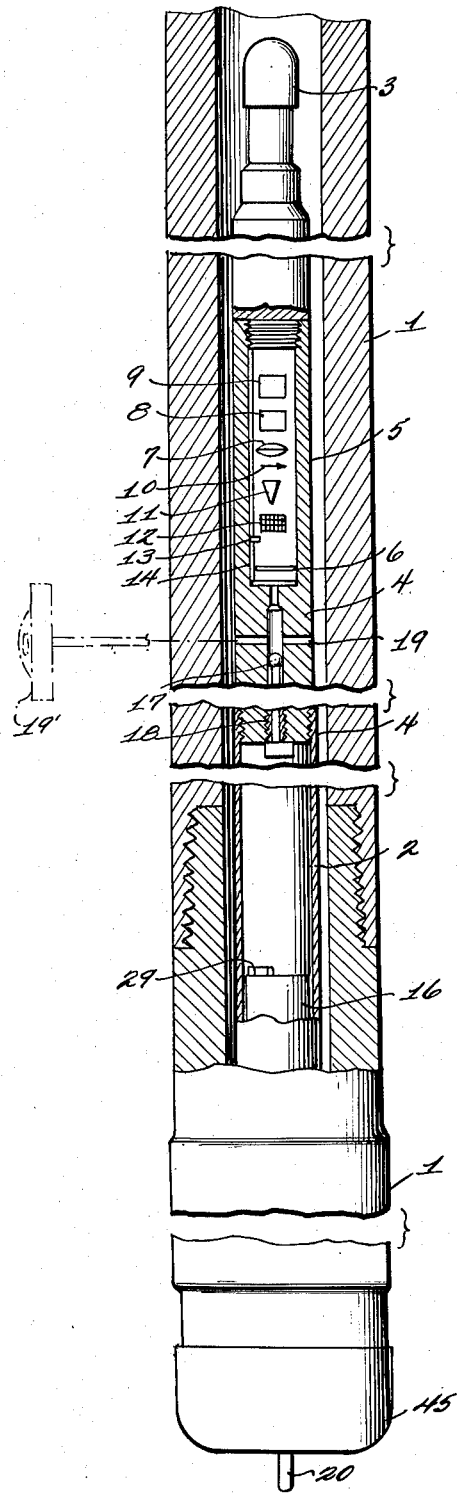
Fig. 2 is a longitudinal view of a core drill partly in vertical section to show above the core receiver an upper compartment housing a recording survey unit.

The drawings show an insertable-retractable wire line core drill 1 containing retrievable core barrel 2 with grab head 3 (Fig. 2). Barrel or tube 2 contains adjacent compartments connected together and circumferentially adjustable with respect to each other. Preferably, as shown, tube 2 separably screws and divides into an upper and a lower compartment. The upper contains a well survey unit 5; the lower constitutes a core receiver and contains a gun unit 16.

To form the upper compartment, housing 4 for survey unit 5 screws into the upper end of core-receiver tube 2. Thus, if desired, the survey housing may be transferred quickly from one core tube 2 to another and the survey unit reset and inserted into its housing. The unit is positioned quickly in this housing by pin and groove connection between the two and the groove serves also as a reference in orientation; that is, engages the survey instrument in the compartment in fixed circumferential orientation with respect to the core tube. Grab head 3 closes the top of housing 4 by threaded connection, as in Fig. 2. Housing 4 is of substantial thickness and is of bronze or other non-magnetic construction to assure accuracy when a magnetic compass is used.

The well survey instruments in the upper compartment may be regarded as a unit. Though variations will be apparent to those skilled in the art, Fig. 2 shows the recording orientation unit 5 in conventionalized style. In housing 4 photosensitive disk 6 beneath camera lens 7 is exposed to light 8 under control of timer 9. This records the shadow of magnetic compass 10 and of plumb 11 through transparent reticle 12, to indicate the respective angles of direction and of inclination of the core barrel at exposure time. Also this disk records the shadow of a reference stud 13 that projects inwardly over disk 6.

To position the survey instrument and to serve also as a reference to orient the gun, housing 4 contains a vertical groove 14 in its inner wall. Into this fits stud 13, extended outwardly from unit 5. Groove 14 thus is correlated to the survey unit and further is to be correlated to the gun unit 16 to be described. Other connecting elements may be used, such as groove and tongue or pin in other positions.

A typical photographic record of survey disk 6 shows in Fig. 7. The compass shadow appears as 10′, the plumb shadow as 11′ and the reference stud shadow as 13′, against a reticle background. Thus the horizontal and vertical angles of the core barrel at the time of exposure are ascertained to provide its orientation and direction or inclination.

The lower compartment of tube 2 ultimately receives a core upon pivoted core dogs 15 when cut by bit head 45, of such length as desired. It houses also tubular gun 16, with space to rise above the core. The top of this compartment vents through a pressure relief valve in survey housing 4. This valve comprises ball 17 seating upon vertical tube 18 beneath connecting side ports 19, indicated in Fig. 2. One side port 19 is constructed directly beneath the groove 14 in housing 4. This port conveniently acts as an alignment reference intermediate gun 16 and survey stud 13, as will be described.

Gun 16 is supported at the lower end of core tube 2, as indicated in Fig. 3. The gun is steadied in the tube by exterior boss 44 fitting against the interior walls of tube 2. Preferably the gun unit simply rests upon the base of core dogs 15 near the bottom of the core receiver. The gun is set in circumferentially aligned position to the survey instrument and so held by a latch until fired. The gun thus provides a path of travel for a missile at orientation and direction toward a bore floor that are ascertained before the missile is discharged or a core is taken.

The orienting latch interconnects the gun and the core tube and comprises ball 21 seated into an exterior backing ring or bushing 39 that can be secured to core tube 2. This seat comprises recess 40 in bushing 39 as shown in Fig. 6. The position of this latch is fixed by the position of a hole 38 in the side of the gun body. This hole 38 forms a common recess with seat 40 to hold ball 21 but deepens downward in a wedge-shaped recess into the gun so that ball 21 can roll away from bushing 39 and thus release the latch when the gun rises. This latch thus serves the multiple functions of latching the gun to the core receiver tube to prevent rise of the gun in the tube and, being localized, of fixing the circumferential position or horizontal angle of the gun and of a missile discharged downwardly from the gun.

The interior structure and operation of gun 16 appear in Figs. 3, 4, 5 and 6.

Trigger means of the gun senses the floor of the bore and responsive to proximity to the floor is actuated to release the gun discharged means. The gun missile is discharged down from the core-tube lengthwise of the gun, along the path previously ascertained as to orientation and direction with respect to the gun, to penetrate and identify its track in the earth formation whether soft or hard of the bore floor under the drill.

Gun casing 16 is a cylinder of essentially solid body through the length of which two chambers extend. In one of these moves a long trigger rod 23; in the other moves a long firing pin 26 and striker rod 28. Associated latch means connect the two. The bottom of the second chamber serves also as firing chamber and gun barrel. Thus the elements that must withstand gun pressure are encased in substantial walls, since the gun body being solid throughout the major area of its lower half, as shown in Figs. 3 and 6, provides a solid wall confining the firing pin and firing chamber. It also confines much of the gun barrel.

In the drawings are shown firing means and actuating means therefor mounted in the gun and comprising a striker for the firing pin, detent means to hold the striker in inactive position, and actuating means comprising a latch and trigger to release the detent and striker, the latch being mounted between the detent and the trigger. The trigger is constructed to move a face against the latch to release the detent. The trigger rod 23, extending below the bottom of the gun casing and below bit head 45, moves lengthwise in its chamber when foot 20 of this rod thrusts against the floor. This movement releases striker 28 to impinge upon firing pin 26 and fire a bullet down into the earth floor. A steel nosed bullet, having large propellant capacity in the extensive chamber above, and so discharging the missile at high power and velocity, can penetrate even a hard rock floor a considerable distance.

Firing pin 26 is suspended with a slight upward bias above the cartridge chamber. This suspension is on a light spring 31 compressed between a boss 32 on pin 26 and a floor in guide 27 that is screwed into casing 16. The top of firing pin 26 extends above this guide into proximity to a striker rod 28. Striker rod 28 is releasably held under downward pressure of heavy spring 30. This is compressed between a boss 33 of rod 28 and an access and adjustment nut 29 in the top of gun 16. On release, striker rod 28 strikes quickly and forcibly upon firing pin 26.

A releasable detent in the form of latch block 34 holds striker 28 inactive up out of contact with firing pin 26 but ready to strike the pin. Latch block 34 is inserted in the gun under the bottom edge of striker rod 28 when the gun is loaded. This block is somewhat oblong and is movable laterally in a slot 34′ that opens through gun body 16. This permits setting and releasing the block. A cut-away opening 35, elongate in the direction of slot 34′, extends down through block 34. This receives the upper end of firing pin 26 and the center of striker rod 28 in registry with each other. In this opening striker rod 28 snaps down to strike upon firing pin 26 when the support of latch block 34 is withdrawn to free striker 28.

Latch block 34 at its inner end is shaped as a cam to be wedged laterally outward for release of striker 28. A complemental cam surface in the side of trigger rod 23 engages under block 34. These mutual cam faces 37 slope up into rod 23 to a horizontal ceiling so that rod 23 rests upon the top of block 34 when the gun is set to fire. As shown in Fig. 3, the cut into rod 23 is wedge-shaped with flat base at the top. Actuation of trigger rod 23 upward wedges block 34 aside out of locking position so that spring-loaded striker 28 can impinge upon firing pin 26. Thus striking of trigger foot 20 against the bore bottom fires a bullet into the bore bottom in the same direction as the drill.

The latch fixing the gun barrel circumferentially also permits lifting movement of the entire gun on recoil. The ball 21 already described is utilized. Wall opening 38 in gun 16 is in fixed position and so constant direction from gun barrel 25, preferably opposite. Ball 21 seated in opening 38 is tight against trigger rod 23 as shown in Fig. 3 and is seated also in depression 40 (Fig. 6) of bushing 39 outside of gun body 16 as shown in Figs. 3 and 5. This ball 21 is secured in that position by tightening an outer nipple 41 around externally threaded bushing 39. Nipple 41 by threads engages also the base of core barrel 2, above bushing 39, and so secures bushing 39 to the core tube externally of the gun. This is shown in Figs. 1, 3, 5, and 6. Nipple 41 at its lower end contains external annular groove races. Into one of these a ball is pressed by the wedging contour of the surrounding wall of the drill sleeve 1 in downward drilling position as shown in Fig. 1. This latches the core barrel 2 against inadvertent rise during drilling. When the drill sleeve is lifted, there is room for the ball to roll back to free the core barrel for vertical play.

Ball 21 presses against the side of trigger rod 23, so tightens the trigger rod in downward position and tends thereby to prevent random vertical play of that rod. Nevertheless when gun 16 is fired on actuation of trigger rod 23, by upward movement of the rod, latch 21 is freed so as to permit limited upward movement of trigger rod in the gun body and as much vertical rise of the gun as may be required. Latch 21 releases the interengagement between the gun body 16 and the core tube 41 and shifts to interengage the lifted trigger rod 23 and gun body 16 and thus serves to engage the gun body with trigger rod 23 so that recoil will lift the entire gun. This new engagement is such that when a core is formed, after the gun discharge, upward thrust of the rising core upon the trigger foot 20 carries the entire gun upward as a unit.

These vertical latching functions of the ball 21 involve structure of the trigger rod 23. In the side of rod 23 a wedge recess 42 extends down and into the rod from opening 38. Recess 42 is cut with a lower horizontal base somewhat deeper than the radius of ball 21 but enough for ball 21 to move from its seat 40 in bushing 39. Rod 23 in rising receives and wedges ball 21 against the top of opening 38 in gun body 16. Thus the entire gun unit rises in tube 2 as shown in Fig. 4. After the recoil rise, enlarged boss 44 of gun 16, fitting snugly within core tube 2, aids in keeping the gun above the core that may then enter the bottom of the drill.

For operation, the gun after cleaning and loading is set to firing position by pushing block 34 into trigger rod 23 at cam detent surfaces 37. Striker 28 and heavy spring 30 then lock upon block 34 by screw 29. Gun unit 16 is inserted into the bottom of core tube 2 through core dogs 15 and adjusted circumferentially to alignment position. This for example brings bullet 24 in its cartridge case 25 vertically under relief port 19 and survey housing groove 14. Bushing 39 is moved to bring seat 40 down upon ball 21. Nipple 41 then secures this assembly to core barrel 2.

This invention provides for simple aligning of bullet 24 with the recording survey instrument. As previously stated, lateral conduit 19 serves as a reference element intermediate the bullet and the survey unit element 14. A level-rod 19' may be inserted into conduit 19. Another level rod 42 is caused to project laterally from bullet 24. This is done conveniently by applying a yoke 42' (Fig. 3) around trigger rod 20 and bullet 24, since they extend below gun 16. Level-rod 42 forms an extension from the yoke that may readily be aligned with the upper level-rod 19'. This may be done as instrument housing 4 is being screwed into core barrel 2 or may be done as the gun is being latched into a core barrel already holding the survey instrument. The assembly then may be lowered into a core drill. It is ready to fire lengthwise of the drill into the bore floor automatically when the trigger sensing element is at the bottom.

In practice, several of these gun assemblies in their core tubes are prepared in advance. When one tube is withdrawn from the drill, another may be lowered into the drill immediately. Where the survey unit is reset and transferred from one gun unit to another, longitudinal alignment is simply determined by stopping the threading of the survey unit into the core barrel when the survey levels are in line as already described. Unskilled workmen in the field can attend to this. After each shot and removal of a core container, each assembly is cleaned and prepared anew.

For reading a core sample, the photograph disk is simply placed on top of the core with the reference stud shadow directly upon the entrance of the bullet into the sample. The orientation data of this reference are then read directly from the disk. This can be done in the field or away from the field. The course of the bullet and the matching earth structure are observed directly and together.

If desired, bullets or other missiles may contain various color or other identifying or research means. Several of these for correlation may be fired into a given sample before coring or into subsequent cores. Those skilled in the art will now understand these and other variations under this invention set forth in the accompanying claims.

In accordance with the patent statutes, this invention has been described and the principles thereof together with the best mode of application set out to enable those skilled in the art to make and use this invention.

What is claimed is:

1. In a rotatable earth core drill having a bit head, means to orient an earth sample of the bore bottom beneath the drill, comprising a vertically disposed cylindrical tube of insertable-retractable wire-line type having a grab head and means to support the tube above the bit head of the drill, a gun supported in the lower part of the tube in a direction to discharge a missile down from the tube into the floor of the bore, means to fire the gun, means to operate the firing means comprising means to sense the bore floor, said sensing means being actuated by proximity to the floor to operate said firing means, a compartment in the tube to house a recording survey instrument, and means to obtain predetermined alignment between the gun and the survey instrument comprising means to engage the survey instrument in the compartment in fixed circumferential orientation with respect to the tube, and means to engage the gun in fixed circumferential orientation with respect to the tube.

2. In a rotatable earth core drill having a bit head, means to orient an earth sample of the bore bottom beneath the drill, comprising a core-receiving tube of insertable-retractable wire-line type having a grab head and supported above the bit head, the tube having adjacent comparements connected together and circumferentially adjustable with respect to each other, recording orienting survey means housed in one compartment of the tube, a gun body supported in the lower part of the tube and directed to fire down into the bore floor, the gun body being relatively loose in the core tube to rise therein, a latch comprising a ring outside the gun body adapted for connection to the core tube, a common recess in the gun body and in the ring to seat a ball, adapted to interconnect the gun body and the core tube, said recess being located and constructed for the ball therein to hold the gun in fixed circumferential position relatively to the core tube, the recess deepening downward into the gun body for a ball seated in the recess to leave the ring on rise of the recess portion of the gun body, means to fire the gun and means to actuate the firing means, the actuating means being operatively connected to the latch ball and constructed and adapted to release the ball and free the gun in the core tube.

3. In a rotatable earth core drill having a bit head, means to orient an earth core sample of the bore bottom beneath the drill, comprising a core-receiving insertable-retractable wire-line type tube supported above the bit head, a gun body supported in the lower part of the tube and containing a firing chamber and gun barrel directed downward to fire into the bore floor, a firing pin in the gun body, the gun body being solid throughout the major area of its lower half and providing an extensive solid wall confining the firing pin and firing chamber, a trigger rod connected to the firing pin and extending to the bottom lengthwise within the body to release the pin, the trigger rod being movable by proximity to the bore bottom to fire the gun.

4. In a rotatable earth core drill having a bit head, means to orient an earth core sample of the bore bottom beneath the drill, comprising a core-receiving tube supported above the bit head, a gun body supported in the lower part of the tube and containing a firing chamber directed downward to fire into the bore floor, a firing pin therein, a trigger rod movable lengthwise of the body and connected to the firing pin for upward movement of the rod to release the firing pin, the trigger rod extending below the bit head for contact with the bore bottom to raise the trigger rod and release the firing pin, a latch engaging the gun body with the core tube, and means actuated by movement of the trigger rod to release the latch and the engagement of the gun body.

5. In a rotatable earth core drill having a bit head, means to orient an earth core sample of the bore bottom beneath the drill, comprising a core-receiving tube supported above the bit head, a gun body supported in the lower part of the tube and containing a firing chamber directed downward to fire into the bore floor, a firing pin therein, a trigger rod movable in the body and connected to the firing pin for movement of the rod to release the firing pin, the trigger rod extending below the gun body and adapted to move the trigger rod by proximity to the bore bottom and release the firing pin, a gun latch comprising a ring surrounding the gun body and adapted for connection to the core tube, and a common recess in the gun body and trigger rod and in the ring to seat a ball, the recess in the trigger rod deepening downward away from the ball for a ball seated in the recess to leave the ring on upward movement of the trigger rod and free the gun on firing to move up in the core tube.

6. In a rotatable earth core drill having a bit head, means to orient an earth core sample of the bore bottom beneath the drill, comprising a core-receiving tube, a gun body directed to fire downward into the bore floor, a firing pin, a trigger rod connected to the firing pin and movable in the body for release of the pin, the rod extending below the gun body to move on contact with the bore floor to release the pin, a latch comprising a body outside the gun adapted for connection to the core tube, a common recess in the latch body and in the trigger rod to hold a stop, the latch body and the gun being adjustable circumferentially before connection to the core tube, the latch stop being removable by movement of the trigger rod on contact with the bore bottom, to free the gun for movement with respect to the core tube.

7. In a rotatable earth core drill having a bit head, means to orient an earth core sample of the bore bottom beneath the drill, comprising a core-receiving insertable-retractable wire-line type tube supported above the bit head, a gun body supported within the lower end of the core tube and containing a firing chamber directed downward to fire into the bore floor, a firing pin releasably held in the gun body, a trigger movably mounted in the body and connected to the firing pin for release of the firing pin on movement of the trigger, the trigger extending down to contact the bore floor and thereon to move for release of the firing pin, latch means, said latch being mounted between the gun body and the core tube for interengagement thereof, the latch being connected to the trigger and adapted to release said interengagement on movement of the trigger, thereby freeing the gun for rise within the core tube, a recording survey instrument and housing therefor secured at the upper end of the core tube, and means intermediate said gun and instrument for aligning the one with the other.

8. In a rotatable earth core drill having a bit head, means to orient an earth core sample of the bore bottom beneath the drill, comprising a core-receiving tube supported above the bit head, a gun body supported at the lower end of the core tube and containing a firing chamber directed downward to fire into the bore floor, a firing pin therein, a trigger extending down into the bit head and adapted to be actuated on proximity to the bore floor, means connecting the trigger and the firing pin comprising a latch operable by actuation of the trigger to release the firing pin, latch means engaging the gun with the core tube and connected wtih the trigger for release on actuation of the trigger, the gun being constructed and arranged to rise in the core tube on firing of the gun and on subsequent thrust of a core entering the tube.

9. In a rotatable earth core drill having a bit head, means to orient an earth core sample comprising a core tube, means to house a recording survey instrument in fixed position at the top of the tube, a gun body supported at the bottom of the tube, in vertical alignment with the survey instrument, firing means comprising a trigger rod, extending below the bit head to contact the bore floor and movable at said contact, a firing chamber directed lengthwise of the gun to fire a missile into the bore floor, a firing pin in said chamber, means to bias said pin away from firing position, striker means to impinge on said pin for firing, a latch interposed between the striker and the pin, said latch being engaged with the trigger rod and releasable therefrom by said movement of the trigger rod on contact with the bore floor, whereby a missile is fired in recorded orientation into the bore floor on contact of the drill therewith.

10. In a rotatable earth core drill of wire line type, means to orient an earth sample of the bore floor, comprising a core tube having a wire line grab head, means to support a gun in the core tube in direction to fire lengthwise of the tube into the floor, a trigger extending below the tube and actuated by the floor, firing means and actuating means therefor mounted in the gun and comprising a striker, detent means to hold the striker in inactive position, and latch means operatively mounted between the detent and trigger and movable to remove the detent, the trigger having wedging engagement with the latch effective on actuation of the trigger by the bore floor to remove the striker detent, whereby the gun automatically fires into the floor when the trigger reaches the bore floor.

11. In a rotatable earth core drill of wire line type, means to orient an earth sample of the bore floor, comprising a core tube having a wire line grab head, a gun supported in the core tube in direction to fire lengthwise of the tube into the floor, a trigger means at the bottom of the tube actuated by the bore floor, firing means and actuating means therefor mounted in the gun and comprising a striker, detent means holding the striker in inactive position, latch means having a cut-away portion movable and constructed to receive the striker in firing position, the trigger means comprising a wedge face contacting the latch means on actuation to move the cutaway portion to receive the striker.

12. In a gun for an orienting core drill, a cylindrical body, a trigger rod movable lengthwise thereof and exposed at the bottom of the gun, an opening in the side of the body extending to the trigger rod, a ball seated therein, a backing ring having a seating recess to hold the ball against the trigger rod, means to secure the ring to a core tube externally of the gun, and a wedge-shaped recess in the trigger rod normally below and deepening downward from the ball, whereby the ball normally tightens the trigger rod in downward position and on upward thrust against the rod is movable into the wedge-shaped recess for limited upward movement of the rod in the body.

13. In an orienting earth core drill having a rotatable bit head, a core tube of wire-line type, recording survey means in the upper part of the tube fixed in position with respect to the core tube and a gun supported in the lower part of the tube directed to fire down into a bore floor, the gun being loosely fitted to permit rise thereof in the tube, latch means relatchably mounted at fixed vertical position in the tube and adapted to interconnect the gun with the core tube to prevent rise of the gun in the tube and means to localize the latch means to fixed position in the circumference of the tube, whereby vertically and circumferentially the position of the latched gun is fixed with respect to the core tube.

References Cited in the file of this patent

UNITED STATES PATENTS

| | | |
|---|---|---|
| 1,711,797 | Koppl | May 7, 1929 |
| 1,813,368 | Toles | July 7, 1931 |
| 2,003,345 | De Maris | June 4, 1935 |
| 2,197,062 | Sweet et al. | Apr. 16, 1940 |
| 2,227,198 | Piggot | Dec. 30, 1940 |
| 2,544,573 | Vincent | Mar. 5, 1951 |
| 2,707,617 | Brady | May 3, 1955 |